1878B2

(12) United States Patent
Rane et al.

(10) Patent No.: US 8,891,878 B2
(45) Date of Patent: Nov. 18, 2014

(54) METHOD FOR REPRESENTING IMAGES USING QUANTIZED EMBEDDINGS OF SCALE-INVARIANT IMAGE FEATURES

(75) Inventors: Shantanu Rane, Cambridge, MA (US); Petros T Boufounos, Boston, MA (US); Mu Li, State College, PA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 180 days.

(21) Appl. No.: 13/525,222

(22) Filed: Jun. 15, 2012

(65) Prior Publication Data
US 2013/0336588 A1    Dec. 19, 2013

(51) Int. Cl.
G06K 9/48    (2006.01)
G06K 9/46    (2006.01)

(52) U.S. Cl.
USPC .......................................... 382/197; 382/190

(58) Field of Classification Search
None
See application file for complete search history.

(56) References Cited

U.S. PATENT DOCUMENTS 8,542,869 B2 *   9/2013   He et al. .................... 382/100
2013/0028516 A1 *   1/2013   Warfield et al. ............... 382/173

* cited by examiner

*Primary Examiner* — Daniel Mariam
(74) *Attorney, Agent, or Firm* — Dirk Brinkman; Gene Vinokur (57) ABSTRACT

Scale-invariant features are extracted from an image. The features are projected to a lower dimensional random projection matrix by multiplying the features by a matrix of random entries. The matrix of random projections is quantized to produce a matrix of quantization indices, which form a query vector for searching a database of images to retrieve metadata related to the image.

18 Claims, 5 Drawing Sheets

Fig. 1A

Method steps at client

1: Initialize the random projection matrix $\mathbf{A} \in \mathbb{R}^{k \times d}$, where the elements $a(i,j) \sim \mathcal{N}(0,1)$.
2: Acquire query image $\mathbf{I}$.
3: Run the scale-invariant feature extraction algorithm on $\mathbf{I}$ to derive the matrix $\mathbf{X} = [x_1, x_2, \ldots, x_M]$, where $x_i$ is a $d$-dimensional feature vector corresponding to the $i^{th}$ key point descriptor from the image $\mathbf{I}$.
4: Compute the matrix $\mathbf{Y} = [y_1, y_2, \ldots, y_M] = \mathbf{A}\mathbf{X} \in \mathbb{R}^{k \times M}$, where each $y_i$ is a $k$-dimensional random projection of the corresponding $x_i$.
5: Compute the matrix of quantized random projections $\mathbf{Q} = q(\mathbf{Y})$, where the function $q(\cdot)$ is a scalar quantizer that takes each $y(i,j), i \in \{1, 2, \ldots, k\}, j \in \{1, 2, \ldots, M\}$ and produces a integer quantization index $q(i,j)$, i.e., for an $L$ level quantizer, $q(i,j) \in 0, 1, \ldots, L-1$.
6: Transmit the matrix $\mathbf{Q}$ to the server, using element-wise fixed length coding of the quantization indices. Thus, each $q(i,j)$ is represented by $\lceil \log_2 L \rceil$ bits.

*Fig. 1B*

Method steps at server

1: Initialize the random projection matrix $\mathbf{A} \in \mathbb{R}^{k \times d}$, where the elements $a(i,j) \sim \mathcal{N}(0,1)$.

2: Acquire images $\mathbf{J}_1, \mathbf{J}_2, ..., \mathbf{J}_t$ of $s$ objects, where $s \leq t$. Create meta-data $\mathbf{D}_i, i \in \{1, 2, ..., s\}$ for each object.

3: Run a scale-invariant feature extraction algorithm on each image $\mathbf{J}_i, i \in \{1, 2, ..., t\}$ which will return several $d$-dimensional features from each image. The number of features obtained from each image need not be equal. Using all the feature vectors thus obtained, construct the matrix $\mathbf{V} = [\mathbf{v}_1, \mathbf{v}_2, ..., \mathbf{v}_N]$ which contains feature vectors from *all images of all objects* in the database. Typically, $N \gg s$.

4: Compute the matrix $\mathbf{W} = [\mathbf{w}_1, \mathbf{w}_2, ..., \mathbf{w}_N] = \mathbf{A}\mathbf{V} \in \mathbb{R}^{k \times N}$, where each $\mathbf{w}_i$ is a $k$-dimensional random projection of the corresponding $\mathbf{v}_i$.

5: Store a lookup vector $\Lambda \subset \{1, 2, ..., s\}^N$ where the element $\Lambda(i), i \in \{1, 2, ..., N\}$ indexes the object from which the vector $\mathbf{w}_i$ was extracted.

*Fig. 2*

Nearest neighbor search

1: Initialize an $s$-dimensional "histogram" vector $\mathbf{h}$ to all zeros.
2: Receive $\mathbf{Q} = [q_1, q_2, ..., q_M]$ as a query. Receive $L$, the number of quantization levels.
3: Invert the quantization function $q(\cdot)$ and obtain the reconstructed random projection matrix $\mathbf{Y} = q^{-1}(\mathbf{Q}) = [y_1, y_2, ..., y_M]$.
4: Compute $\mathbf{W} = q^{-1}(q(\mathbf{W}))$, which contains the quantized reconstruction of all $k$-dimensional random projections corresponding from all $t$ images of $s$ objects.
5: for each $i \in \{1, 2, ..., M\}$ do
6:     Find the nearest neighbor of $y_i$ among $\mathbf{w}_1, \mathbf{w}_2, ..., \mathbf{w}_N$.
7:     Out of these $M$ nearest neighbor pairs, and choose $r$ pairs $(y_{(j)}, \mathbf{w}_{(j)}), j = 1, 2, ..., r$ that are closest in Euclidean distance.
8:     for each $\mathbf{w}_{(j)}, j = 1, 2, ..., r$ do
9:         Read off the index $\alpha_j \in \{1, 2, ..., s\}$ of the object from which the element occurs. This is readily available from the lookup table $\Lambda$ from Algorithm 1.
10:         Increment $h(\alpha_j)$ by 1.
11: Set the nearest object to the query image as $\arg\max_\alpha h(\alpha)$ and send the meta-data of this object back to the querying device.

METHOD FOR REPRESENTING IMAGES USING QUANTIZED EMBEDDINGS OF SCALE-INVARIANT IMAGE FEATURES

FIELD OF THE INVENTION

This invention relates generally to extracting features from images, and more particularly to using the features to query databases.

BACKGROUND OF THE INVENTION

Augmented reality is a significant application to leverage recent advances in computing devices, and more particularly mobile devices. The mobile devices can include clients such as mobile telephones (cell phone), personal digital assistants (PDA), a tablet computers and the like. Such devices have limited memory, processing, communication, and power resources. Hence, augmented reality applications present a special chalange in mobile environments.

The devices can acquire images or videos using either a camera or network. The images can be of real world scenes, or synthetic data, such as computer graphic images or animation videos. Then, the devices can augment the experience for a user by overlaying useful information on the images or videos. The useful information can be in the form of metadata.

For example, the metadata can be information about a historical landmark, nutrition information about a food item, or a product identified with a (linear or matrix) bar in an image.

To enable such applications, it is necessary to exploit recent advances in image recognition, while recognizing the limitations on the device resources. Thus, in a typical augmented reality application, the mobile device must efficiently transmit the salient features of a query image to a database at a server that stores a large number of images or videos. The database server should quickly determine whether the query image matches an entry in the database, and return suitable metadata to the mobile device.

Many image-based augmented reality applications use scale-invariant feature transform (SIFT), speeded up robust feature (SURF), and GIST, see e.g., U.S. 20110194737.

SIFT and SURF acquire local details in an image, and therefore, have been used to match local features or patches. They can also be used for image matching and retrieval by combining hypotheses from several patches using, for example, the popular "Bag-of-Features" approach. GIST acquires global properties of the image and has been used for image matching. A GIST vector is an abstract representation of a scene that can activate a memory representations of scene categories, e.g., buildings, landscapes, landmarks, etc.

SIFT has the best performance in the presence of common image deformations, such as translation, rotation, and a limited amount of scaling. Nominally, the SIFT feature vector for a single salient point in an image is a real-valued, unit-norm 128-dimensional vector. This demands a prohibitively large bit rate required for the client to transmit the SIFT features to a database server for the purpose of image matching, especially if features from several salient points are needed for reliable matching.

A number of training-based methods are known for compressing image descriptors. Boosting Similarity Sensitive Coding (BoostSSC) and Restricted Boltzmann Machines (RBM) are known for learning compact GIST codes for content-based image retrieval. Semantic hashing has been transformed into a spectral hashing problem, in which it is only necessary to calculate eigenfunctions of the GIST features, providing better retrieval performance than BoostSSC and RBM.

Besides these relatively recently developed machine learning methods, some conventional training-based techniques such as Principle Component Analysis (PCA) and Linear Discriminant Analysis (LDA) have also been used to generate compact image descriptors. In particular, PCA has been used to produce small image descriptors by applying techniques such as product quantization, and distributed source coding. Alternatively, small image descriptors can be obtained by applying LDA to SIFT-like descriptors followed by binary quantization.

While training-based methods perform accurately in conventional image retrieval, they can become cumbersome in augmented reality applications, where the database continuously evolves as new landmarks, products, etc. are added, resulting in new image statistics and necessitating repeated training.

As a source coding-based alternative to training-based dimensionality reduction, a low-bit rate descriptor uses Compressed Histogram of Gradients (CHoG) specifically for augmented reality applications. In that method, gradient distributions are explicitly compressed, resulting in low-rate scale invariant descriptors.

Other techniques are known for efficient remote image matching based on Locality Sensitive Hashing (LSH), which is computationally simpler, but less bandwidth-efficient than CHoG, and does not need training. Random projections are determined from scale invariant features followed by one-bit quantization. The resulting descriptors are used to establish visual correspondences between images acquired in a wireless camera network. The same technique can be applied to content-based image retrieval, and a bound is obtained for the minimum number of bits needed for a specified accuracy of nearest neighbor search. However, those methods do not consider a tradeoff between dimensionality reduction and quantization levels.

SUMMARY OF THE INVENTION

The embodiments of the invention provide a method for representing an image by extracting featrures from the image. in one embodiment, the image is a query image. The representation can be performed in a client, and the extracted feaures can be transmitted to a server to search a databases of similarly represented images for matching. Metadata of matching images can be returned to the client.

The method extracts scale invariant features from the query image. Then, a small number of quantized random projections of the features are determined and quantized. The quantized projections are used to search a database at the server storing images in a similar form.

The server performs a nearest neighbor search in a low-dimensional subspace of the quantized random projections, and returns metadata corresponding to the query image.

Prior art work has shown that binary embeddings of image features enable efficient image retrieval.

The embodiments invention allow a trade-off that balances the number of random projections and the number of bits, i.e., the quantizing levels, used to store the projection.

Theoretical results suggest a bit allocation scheme under a total bit rate constraint. It is often advisable to use bits on a small number of finely quantized random projections, rather than on a large number of coarsely quantized random projections.

The method achieves a retrieval accuracy up to 94%, while requiring a mobile client device to transmit only 2.5 kB to the server for each image. This as a significant improvement over 1-bit quantization schemes known in the art.

Hence, the method is particularly suited for mobile client applications that are resource constrained.

DETAILED DESCRIPTION OF THE PREFERRED EMBODIMENTS

The embodiments of the invention provide a method for extracting features from a query image in a client. The features can be transmitted to a server, and used to search a database to retrieve similar images, and image specific metadata that are appropriate in an augmented reality application.

Figure 1A:
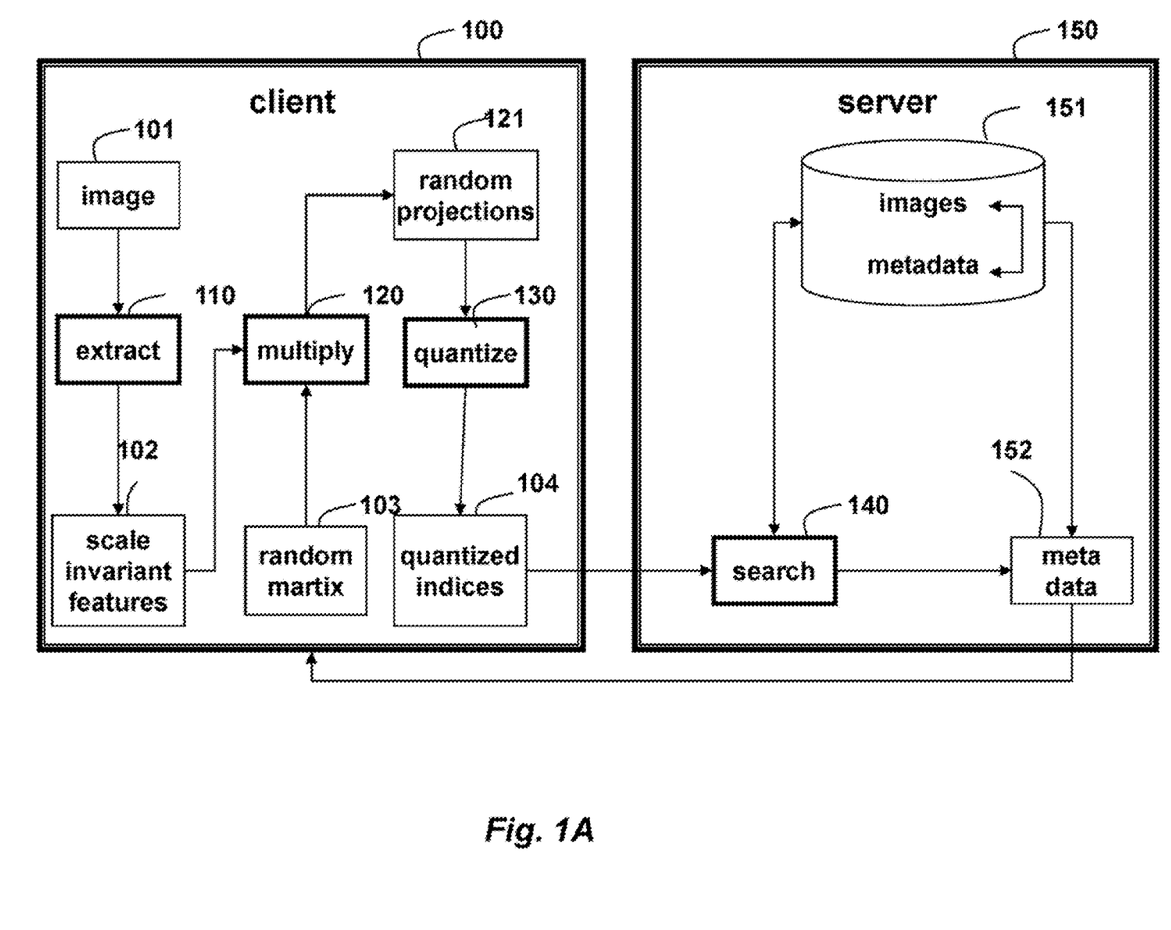
FIG. 1A is a flow diagram of a method for representing an image by a client according to embodiments of the invention.

FIG. 1 shows a method for representing an image 101. Features 102 are extracted 110 from the image. It is understood that the method can be applied to a sequence of images, as in a video. The images can be of real world scenes, or synthetic data. The images can be acquired directly by an embedded camera, or downloaded via a network.

The features are scale-invariant. The features are multiplied 120 by a matrix 103 of random entries to produce a matrix of random projections 121. The matrix of random projections is quantized 130 to produce a matrix of quantization indices 104 that represent the image. The indices matrix can re-arranged into a query vector.

The query vector is transmitted to the server, which searches 140 the database 151 for similar images, and retrieves the metadata 152 for the client.

Quantized Randomized Embeddings

The invention is based, in part, on a low-dimensional embedding of scale-invariant features extracted from images. The use of embeddings is justified by the following result, which forms a starting point of our theoretical development.

Theorem 1 Johnson-Lindenstrauss Lemma: For a real number $\epsilon \in (0,1)$ and points n, a positive integer k is $$k \geq \frac{4}{\epsilon^2/2 - \epsilon^3/3} \ln n.$$

This lemma means that a small set of points, e.g., features, in a high-dimensional space can be embedded into a space which has a substantially lower dimension, while still preserving the distances between the points.

Then, for any set $X \subset R^d$ that contains n points, there is a mapping $f: R^d \rightarrow R^k$, computable in randomized polynomial time, such that for all $u, v \in X$, e.g., pixels at locations (u,v) in image X 101.

$$(1-\epsilon)\|u-v\|^2 \leq \|f(u)-f(v)\|^2 \leq (1+\epsilon)\|u-v\|^2$$

A realization from the above result is that for a given $\epsilon$, the dimensionality k of the points in the range of $f$ is independent of the dimensionality of points in X and proportional to the logarithm of number of points in X. Since k increases as ln n, the Johnson-Lindenstrauss Lemma establishes a dimensionality reduction result, in which any set of n points (features) in d-dimensional Euclidean space can be embedded into k-dimensional Euclidean space. This is extremely beneficial for querying very large databases, i.e., a large n) with several attributes, i.e., a large d.

One way to construct the embedding function $f$ is to project the points (features) from X onto a spherically random hyperplane passing through the origin. In practice, this is accomplished by multiplying the data vector with the matrix 103 of independent and identically distributed (i.i.d.) if each random variables. In particular, the random matrix with i.i.d. N(0,1) entries provides the distance-preserving properties in Theorem 1 with high probability. The following result makes this notion precise.

Theorem 2 For real numbers $\epsilon, \beta > 0$, let there be a positive integer k such that $$k \geq \frac{4 + 2\beta}{\epsilon^2/2 - \epsilon^3/3} \ln n. \quad (1)$$

Consider a matrix $A \in R^{k \times d}$, whose entries a(i,j) are drawn i.i.d. from a N(0,1) distribution. Let there be a set $X \in R^d$ that contains n points. Then, for all $u \in X$, the mapping $$f(u) = \frac{1}{\sqrt{k}} A u$$

satisfies the distance preserving property in Theorem 1 with probability at least as large as $1 - n^{-\beta}$ By construction, $f(u)$ is a k-dimensional embedding of a d-dimensional vector. Theorem 2 holds for other distributions on a(i,j), besides the normal distribution. In what follows, however, we consider only the normal Gaussian distribution.

We are interested in a distance-preserving property for quantized embeddings, i.e., the case when a uniform scalar quantizer is used independently to each element of $f(u)$ and $f(v)$. Theorem 2 indicates that, in the unquantized case, the embedding $f$ is $\epsilon$-accurate with probability $1 - n^{-\beta}$. We describe the embedding accuracy when quantization is used to reduce the bit rate required to store or transmit the embeddings. Furthermore, we are interested in the trade-off that balances the number of quantization levels and the number of projections k that can be transmitted with a specified bandwidth.

The following proposition is the first step in understanding this trade-off.

Proposition 1 For real numbers $\beta > 0$ and $\epsilon \in (0,1)$, let there be a positive integer k that satisfies (1). Consider a matrix $A \in R^{k \times d}$, whose entries a(i,j) are drawn i.i.d. from a N(0,1) distribution. Let there be a set $X \in R^d$ that contains n points. For any vector w, let q(w) be an uniform scalar quantizer with step size $\Delta$ applied independently to each element of w. Then, for all $u, v \in X$, the mapping $$g(u) = \frac{1}{\sqrt{k}} q(Au)$$

satisfies $$(1-\epsilon)\|u-v\| - \Delta \leq \|g(u)-g(v)\| \leq (1+\epsilon)\|u-v\| + \Delta$$

with probability at least as large as $1 - n^{-\beta}$.

Proof. First note, that quantization, q(Au), introduces error at most $\Delta/2$ per dimension, i.e., $\|Au-q(Au)\| \leq \sqrt{k}\Delta/2$ for any x. Using this, along with $$f(u) = \frac{1}{\sqrt{k}} Au$$

as in Theorem 2, we get $\|f(u)-g(u)\| \leq \Delta/2$. Now, take the square roots in the statement of Theorem 1 noting that, for $\epsilon \in (0,1)$, $1+\epsilon \geq \sqrt{(1+\epsilon)}$ and $1-\epsilon \leq \sqrt{(1-\epsilon)}$, we get $$(1-\epsilon)\|u-v\| \leq \|f(u)-f(v)\| \leq (1+\epsilon)\|u-v\|.$$

Then, the right half of the theorem statement follows from the triangle inequality as $$\|g(u)-g(v)\| \leq \|g(u)-f(u)\| + \|f(u)-f(v)\| + \|f(v)-g(v)\| \leq \Delta/2 + (1+\epsilon)\|u-v\| + \Delta/2.$$

The proof for the left half is similar.

Tthe accuracy of the quantized embedding depends on the scalar quantization interval $\Delta$. This, in turn, depends on the design of the scalar quantizer and the bit-rate B used to encode each coefficient.

We consider a finite uniform scalar quantizer with saturation levels $\pm S$, that we assume to be set such that saturation is sufficiently rare and can be ignored. Thus, B bits are used to uniformly partition the range of the quantizer 2S, making the quantization interval $\Delta = 2^{-B+1}S$.

Using R to denote the bit rate available to transmit the k projections, i.e., setting $B=R/k$ bits per measurement, the quantization interval is $\Delta = 2^{-R/k+1}S$. Thus, the trade-off, implicit in Proposition 1, balances the number of projections and the number of bits per measurement, which becomes more explicit:

$$(1-\varepsilon)\|u-v\| - 2^{-\frac{R}{k}+1}S \leq \|g(u)-g(v)\| \leq (1+\varepsilon)\|u-v\| + 2^{-\frac{R}{k}+1}S \quad (2)$$

Specifically, increasing the number of projections for a fixed rate R, decreases the available rate per measurement and, therefore, increases the quantization interval $\Delta$. This, in turn, increases the quantization error ambiguity, given by the additive factor $$\pm 2^{-\frac{R}{k}+1}S.$$

Furthermore, increasing the number of projections reduces $\epsilon$ and, therefore, reduces the ambiguity due to Theorem 2, given by the multiplicative factor $(1\pm\epsilon)$. For fixed $\beta$ and n, $\epsilon$ scales approximately proportionally to $1/\sqrt{k}$ when small.

There are two additional issues: non-uniform quantization, and saturation. A non-uniform scalar quantizer, tuned to the distribution of the projections, could improve the performance of embedding. However, the quantization still suffers from the same trade-off between number of bits per measurement and the number of projections. Similarly, adjusting the saturation rate of the uniform quantizer is a way to tune the quantizer to the distribution of the projections. Reducing the range of the quantizer S, reduces the quantization interval $\Delta$ and the ambiguity due to quantization.

However, the probability of saturation is increased, and consequently, the unbounded error due to saturation, making the above model invalid, and the theoretical bounds inapplicable. In the context of compressive sensing reconstruction from quantized random projections, careful tuning of the saturation rate can improve performance.

The theoretical development above fails for quantization at 1-bit per projection, which is performed just by keeping the sign of the projection. If two signals in the set of interest are a multiple of each other by a positive scalar, they are indistinguishable in the embedding. While for bounded norm signals the guarantees still hold, the bounds are often too loose to be useful. Tighter bounds can instead be developed when we are interested in the angles between two signals, i.e., their correlation, instead of their distance.

Embeddings of Scale-Invariant Image Features

We now describe our method for retrieving image-specific metadata from a server database using the query image 101 that has quantized embeddings of scale-invariant features.

In an example application, a user of a mobile client device, e.g., a cell phone, wants to find out more information about a query image, such as history of a monument, or nutrition information for a food item. The user can acquire the query image with a camera in the device, or down-load the image via a network.

The device transmits a representation of the query image to the database server. The server locates a similar image in the database. The image closely matches the query image according to some predetermined distance criterion, and transmits metadata of associated with that image to the client.

For a practical application, the following requirements should be satisfied. The mobile device, having limited resource, uses a low complexity method to generate a representation of the image to be transmitted. The bandwidth required to transmit the representation is low. The server has sufficient resources to quickly process the query, and transmit the metadata to the client.

We are primarily concerned with the first two requirements, which are the most challenging. Nevertheless, the server-based matching and enhance metadata compression supplements the advantages of our method.

Figure 2:
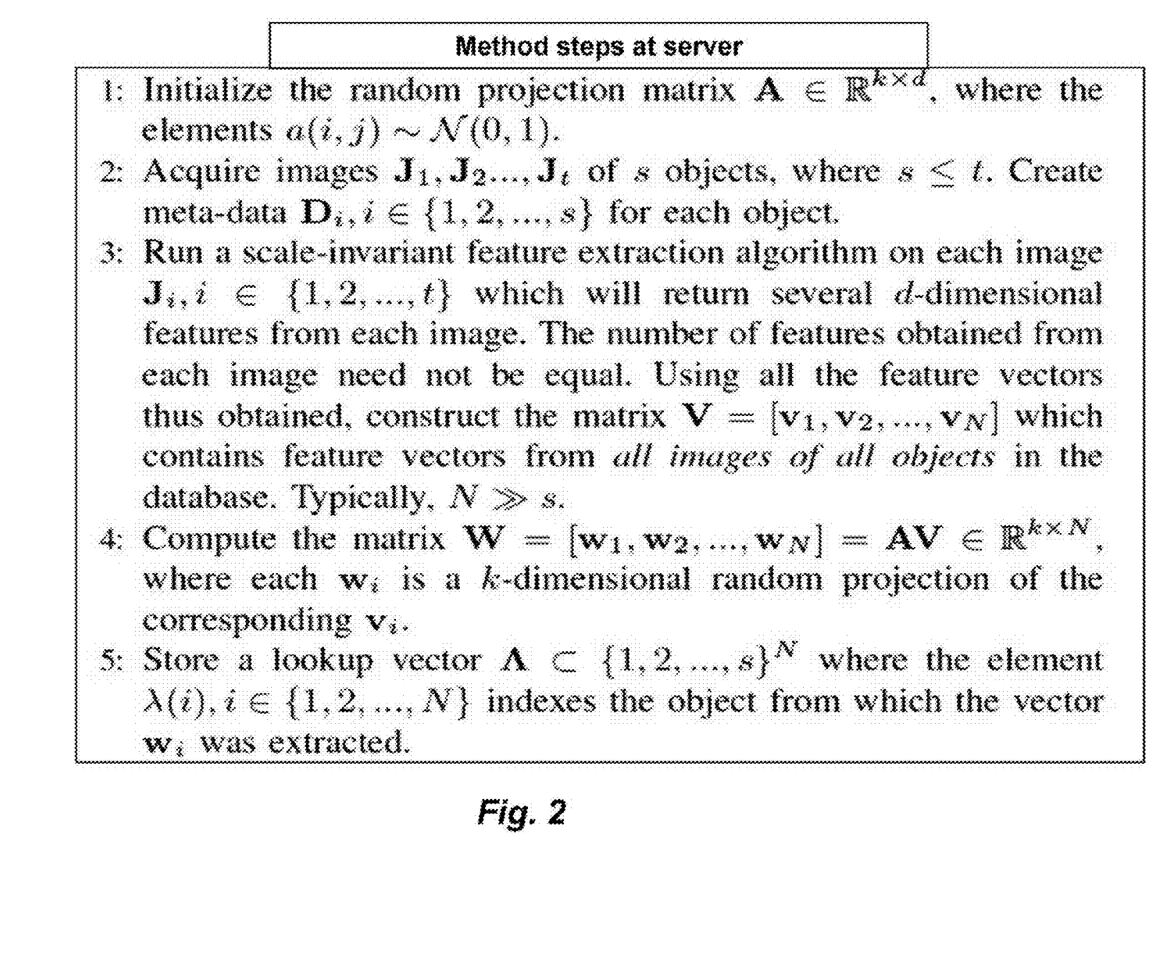
FIG. 2 is pseudocode of the method for representing images at a server according to embodiments of the invention.

As shown in the pseudocode of FIG. 2, we describe steps taken by the server to construct the database 201. It is understood that the representations of images stored in the database is similar to the representation of the query.

The method initialize the random projection matrix $A \in R^{k \times d}$ with elements $a(i,j): N(0,1)$. Images $J_1, J_2, \ldots, J_t$ for s real or synthetic scenes are acquired, where $s \leq t$, and generate the metadata $D_i$, $i \in \{1, 2, \ldots, s\}$ for each object.

The scale-invariant feature extraction method is applied to each image $J_i$, $i \in \{1, 2, \ldots, t\}$, which extracts several d-dimensional features from each image. The number of features extracted from each image need not be equal.

Then, using all the feature vectors thus obtained, construct the matrix $V=[v_1, v_2, \ldots, v_N]$, which contains feature vectors from all images in the database. Typically, $N \gg s$.

Determine the random matrix $W=[w_1, w_2, \ldots, w_N]=AV \in R^{k \times N}$, where each $w_i$ is a k-dimensional random projection of the corresponding $v_i$.

Store a lookup vector $\Lambda \subset \{1, 2, \ldots, s\}^N$, where the element $\lambda(i)$, $i \in \{1, 2, \ldots, N\}$ indexes the image from which the vector $w_i$ was extracted.

Figure 1B:
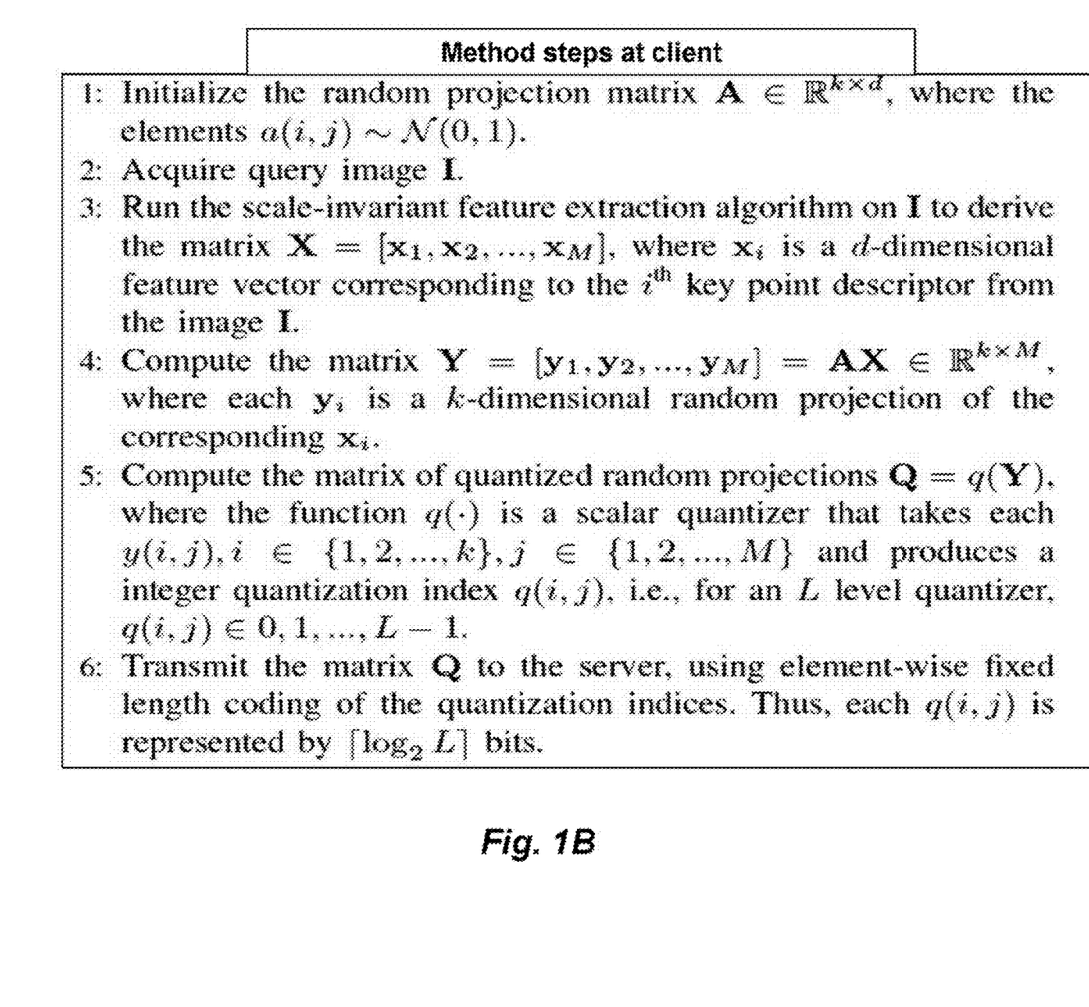
FIG. 1B is pseudocode of the method for representing the image according to embodiments of the invention.

Next, we describe the query procedure. The procedure is performed by the mobile device using the same random projection matrix A as the server. The distribution of the $a(i,j)$ can be approximated by a pseudorandom number generator. The seed of the pseudorandom number generator is sent to the mobile device as a one-time update, or included as part of the client software installation. The seed ensures that the mobile device and the server generate the same realization of the matrix A by having identical seeds.

We initialize the random projection matrix $A \in R^{k \times d}$, where the elements $a(i,j)$: $N(0,1)$. Acquire the query image I 101. Apply 110 the scale-invariant feature extraction method on I to derive the matrix $X=[x_1, x_2, \ldots, x_M]$ 102, where $x_i$ is a d-dimensional feature vector corresponding to the $i^{th}$ key point descriptor from the image I.

Determine the matrix $Y=[y_1, y_2, \ldots, y_M]=AX \in R^{k \times M}$ 103, where each $y_i$ is a k-dimensional random projection of the corresponding $x_i$.

Determine the matrix 104 of quantized random projections $Q=q(Y)$, where the function $q(\cdot)$ is a scalar quantizer that takes each $y(i,j)$, $i \in \{1, 2, \ldots, k\}$, $j \in \{1, 2, \ldots, M\}$ and produces a integer quantization index $q(i,j)$, i.e., for an L level quantizer, $q(i,j) \in 0, 1, \ldots, L-1$.

Transmit the matrix Q to the server 150, using element-wise fixed length coding of the quantization indices. Thus, each $q(i,j)$ is represented by $\lceil \log_2 L \rceil$ bits.

Based on the above procedure, the computational complexity at the mobile device is primarily determined by the scale-invariant feature extraction method, and one matrix multiplication. The number of bits transmitted by the client to the server is $kM \lceil \log_2 L \rceil$ bits.

To minimize transmit power, the client can reduce the number of random projections k, the quantization levels L, or the number of features M extracted from the query image.

Figure 3:
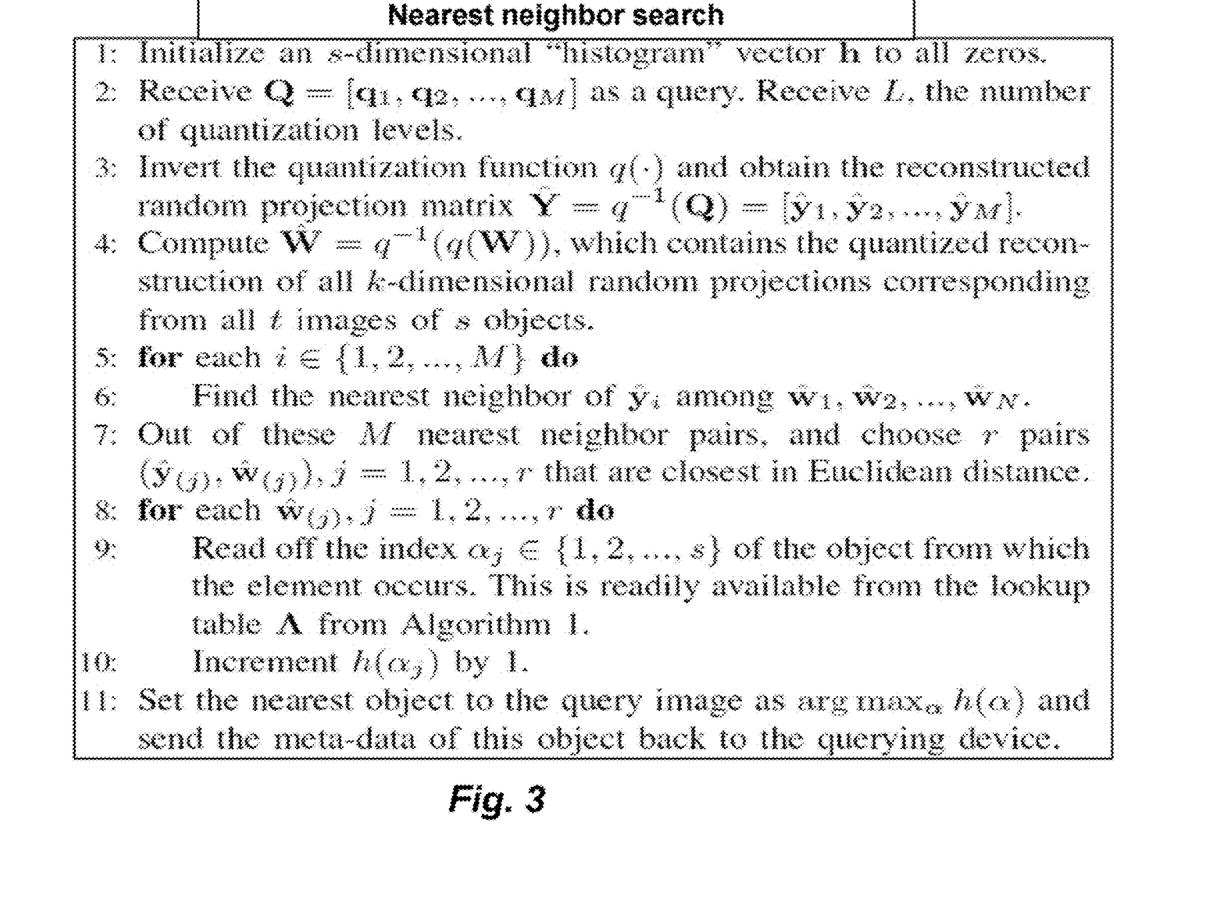
FIG. 3 is pseudocode of the method for searching a database according to embodiments of the invention.

FIG. 3 shows the pseudocode for the approximate nearest neighbor search 140 performed by the server. Briefly, nearest neighbors are found in the space of the quantized embeddings of image descriptors. The nearest neighbors are aggregated to obtain the matching image, and thence the associated metadata 152.

Figure 4:
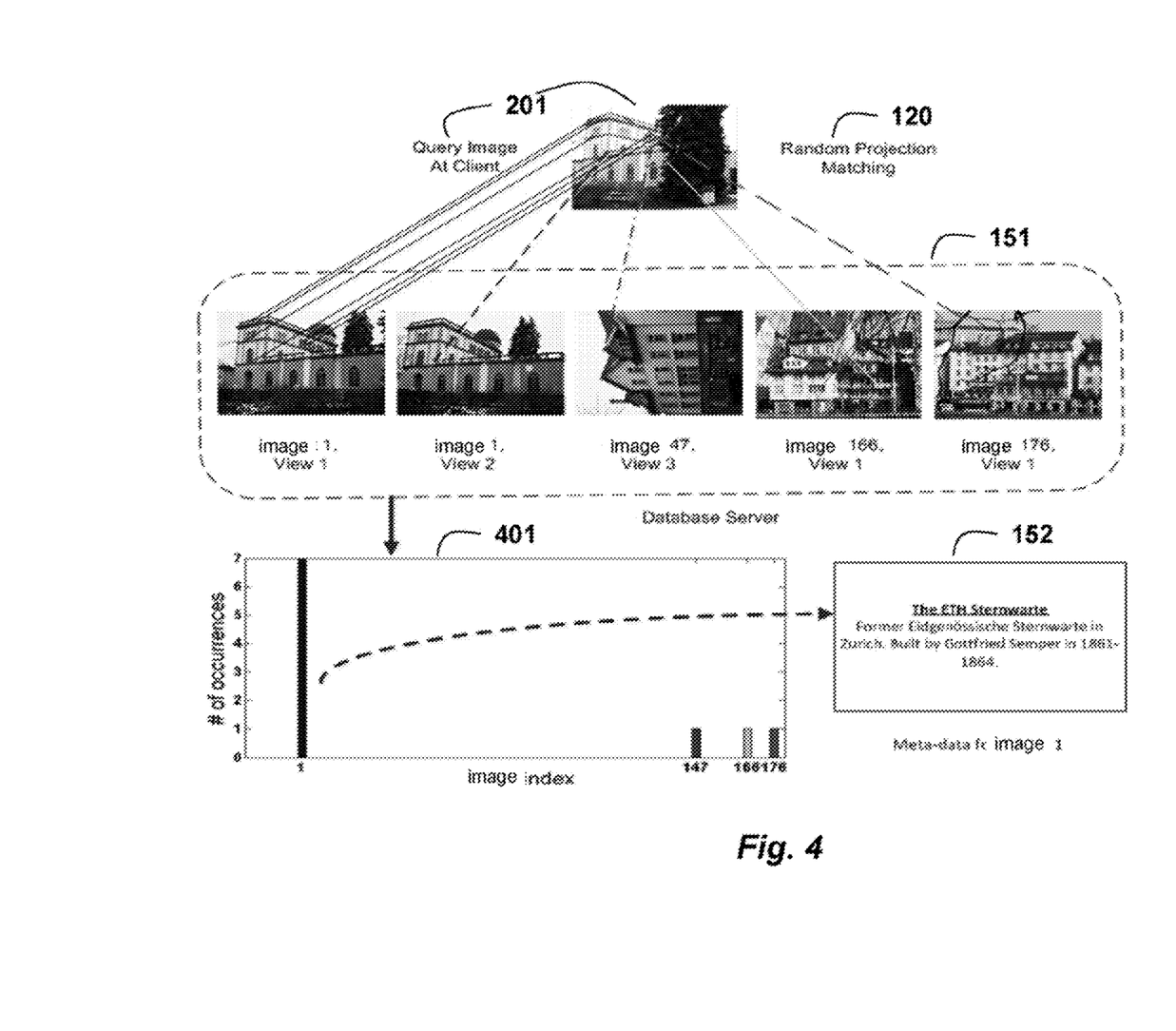
FIG. 4 is a schematic of operations of the embodiments.

FIG. 4 shows the operation schematically, where r=10. In FIG. 4, the query image 201 acquired. The server uses random projection 120 matching with representations of images in the database 151. Image indices 401 are obtained as a function of the number of matching occurances. The index with the highest number of occurances is used to locate the associated metadata 152.

The nearest neighbor procedure initializes an s-dimensional histogram vector h to all zeros.

Receive $Q=[q_1, q_2, \ldots, q_M]$ 104 representing the query image 101. Receive the number of quantization levels L.

Invert the quantization function $q(\cdot)$ and obtain the reconstructed random projection matrix $\hat{Y}=q^{-1}(Q)=[\hat{y}_1, \hat{y}_2, \ldots \hat{y}_M]$ 103.

Determine $\hat{W}=q^{-1}(q(W))$, which contains the quantized reconstruction of all k-dimensional random projections corresponding from all t images of s objects.

For each $i \in \{1, 2, \ldots, M\}$, locate the nearest neighbor of $\hat{y}_i$ among $\hat{w}_1, \hat{w}_2, \ldots, \hat{w}_N$. Out of these M nearest neighbor pairs, select r pairs $(\hat{y}_{(j)}, \hat{w}_{(j)})$, $j=1, 2, \ldots, r$ that are closest in Euclidean distance.

For each $\hat{w}_{(j)}$, $j=1, 2, \ldots, r$, read the index $\alpha_{j \in \{1, 2, \ldots, s\}}$ of the object from which the element occurs. This is readily available from the lookup table $\Lambda$, and increment $h(\alpha_j)$ by 1.

Set the most similar object/image to the query image as $\arg_{max_\alpha} h(\alpha)$, and transmit the metadata of this object back to the mobile device.

When more images, or superior quality images or richer metadata become available, they can be appended to the database without affecting the querying method.

Effect Of The Invention

The embodiments of the invention enable randomized embeddings of scale invariant image features for image searching while reducing resource consumption at the client compared with directly using the scale invariant features as in the prior art.

When the bandwidth is constrained, it makes sense to allocate bits towards increasing the number of incoherent projections. However, after a certain minimum number of random projections is satisfied, it is more beneficial to utilize any additional bits toward representing the projections with high fidelity, rather than continuing to increase the number of coarsely quantized random projections.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for representing an image, comprising the steps of:
    extracting features from the image, wherein the features are scale-invariant;
    projecting the features to produce a matrix of random projections by multiplying the features by a matrix of random entries; and
    quantizing the matrix of random projections to produce a matrix of quantization indices representing the image, wherein the steps are performed by a processor in a client.

2. The method of claim 1, wherein the client is a mobile device.

3. The method of claim 2, wherein the transmitting uses an element-wise fixed length coding of the quantization indices.

4. The method of claim 1, wherein the matrix of quantization is a query vector; and further comprising:
    transmitting the, query vector to a server;
    receiving metadata related to the image by searching a database of images represented similarly as the image with respect to the extracting, multiplying, and quantizing.

5. The method of claim 4, wherein a rate of the transmitting depends on a quantization interval.

6. The method of claim 4, wherein a seed for generating the matrix of random entries is identical at the client and the server.

7. The method of claim 4, wherein the query vector is $kM \lceil \log_2 L \rceil$ bits, where a number of the random projections is k, a quantization levels L, and a number of features is M.

8. The method of claim 7, further comprising:
    minimizining transmit power by reducing a number of random projections k, a number of quantization levels L or a number of features M.

9. The method of claim 4, wherein the searching is a nearest neighbor search.

10. The method of claim 9, wherein the nearest neighbor search uses Euclidean distances between the image and the database of images.

11. The method of claim 4, wherein the server determines a number of matching occurances for the query image, and the metadata is related to the image in the database set of images with a highest number of occurances.

12. The method of claim 1, wherein the quantization uses a non-uniform scalar quantizer applied individually to each element of the matrix of random projections.

13. The method of claim 1, wherein the quantization is a vector quantizer applied individually to groups of elements in the matrix of random projections.

14. The method of claim 1, further comprising:
transmitting of the matrix of quantization indices to server using variable-length entropy coding of the quantization indices.

15. The method of claim 1, further comprising:
reducing a dimensionality of the features by the projecting.

16. The method of claim 15, further comprising:
balancing the dimensionality reduction by the projecting and a number of levels of the quantizing.

17. The method of claim 15, wherein the dimensionality reduction preserves distances between pairs of the features.

18. The method of claim 1, wherein the quantization uses a uniform scalar quantizer applied separately to each random projection.

* * * * *